United States Patent [19]

Reed et al.

[11] Patent Number: 5,425,000
[45] Date of Patent: Jun. 13, 1995

[54] SPATIAL REJECTION OF DIRECT BLAST INTERFERENCE IN MULTISTATIC SONARS

[75] Inventors: Francis A. Reed, Yorba Linda; Paul H. Thai, Fountain Valley, both of Calif.

[73] Assignee: Hughes Aircraft Company, Los Angeles, Calif.

[21] Appl. No.: 169,887

[22] Filed: Dec. 16, 1993

[51] Int. Cl.$^6$ .................................................. G01S 15/02
[52] U.S. Cl. .................................. 367/131; 367/900; 367/901; 367/119; 367/98
[58] Field of Search ............... 367/100, 117, 118, 119, 367/131, 135, 900, 901, 103, 88, 98

[56] References Cited

U.S. PATENT DOCUMENTS

| | | | |
|---|---|---|---|
| 3,763,490 | 10/1973 | Hadley et al. | 367/123 |
| 4,316,270 | 2/1982 | Van't Hullenaar | 367/90 |
| 5,251,185 | 10/1993 | Baggenstoss | 367/100 |

OTHER PUBLICATIONS

"An Algorithm for Linearly Constrained Adaptive Array Processing," O. L. Frost, Proceedings of the IEEE, vol. 60, No. 8, Aug. 1972.

*Primary Examiner*—Ian J. Lobo
*Attorney, Agent, or Firm*—Wanda K. Denson-Low

[57] ABSTRACT

A multistatic sonar system (50) employing a short duration automatic gain control (AGC) following beamforming of the return signal to reject spatial transients at the sonar waveform leading and trailing edges. The output of the beamformer (58) is delayed by a delay line (60A) before passing through a programmable gain (60B). The magnitude of an undelayed version of the beamformer output is also squared (60D) and averaged over a time window (60E). This average is used to normalize the delayed value of the beamformer output. The normalized output of the beamformer is compared (60C) with a threshold having a value much greater than unity, and the comparator output controls the gain circuit (60B). When the normalized value of the beamformer output exceeds the threshold value, the gain of the AGC is set to a value much smaller than unity. When the normalized value of the beamformer output does not exceed the threshold, the gain of the AGC is set to unity.

31 Claims, 3 Drawing Sheets

NOTCH FORMED WITH 3 NULLS OVER A 3° SECTOR

5,425,000

SPATIAL REJECTION OF DIRECT BLAST INTERFERENCE IN MULTISTATIC SONARS

FIELD OF THE INVENTION

The present invention relates to active sonar systems, and more particularly to an apparatus and method of spatial rejection of direct blast interference in multistatic sonars.

BACKGROUND OF THE INVENTION

In bistatic and multistatic active sonars, used e.g., for tactical and surveillance applications, the transmitter is located at an appreciable distance from the receiver. The distance between the source and the receiver is generally much less than the length of the sound path from the source to the target to the receiver. The arrival of the transmitted waveform at the receiver directly from the transmitter, known as the "direct blast," is therefore much stronger than the target echo. Typical geometries show the direct blast to be 40 to 60 dB above typical target echoes. The direct blast can arrive simultaneously with echoes of previously transmitted waveforms from targets at ranges of interest, preventing their detection.

Most spatial processing applications deal with interferences that are continuous (rather than pulsed like active waveforms), and much lower in level. A "spatial transient," occurring when the waveform leading or trailing edge is propagating across the array, can result in signal masking even when a spatial null is steered in the direction of the source. This transient is many dB below the overall direct blast level, but may still mask the signal because the direct blast level is 40-60 dB above the signal.

Existing systems detect the presence of the direct blast by using desensitized hydrophones in the receiving array to determine when the direct blast is present. These systems use this information to "blank" system operation during the entire direct blast, either by reducing gain into the system during the entire direct blast period or by simply not processing data. Blanking prevents detection of signals masked by the direct blast, even though they arrive from different directions than the source direction.

Spatial processing techniques, either through design of low sidelobes, null steering, or adaptive methods, attempt to reduce the level of the direct blast when it arrives from a different angle than the target of interest. When the direct blast is 40 to 60 dB above the signal, the spatial transient is still strong enough to limit detection of many signals. The spatial transient is a unique phenomenon related to the direct blast in multistatic systems (or other transient interferences many orders of magnitude larger than the signal of interest). Conventional spatial rejection techniques, whether adaptive or fixed parameter approaches, will exhibit the spatial transient and will not, therefore, effectively reject these strong interferences to a degree which allows detection of a signal 40-60 dB lower in level.

The effects of direct blast can be reduced by several techniques. The sonar can be operated in range-doppler bins other than that containing the direct blast when the signal to be detected is an echo of the same waveform as the direct blast. While it cannot be guaranteed that the target will appear at a different doppler than the direct blast, the ability to operate in other range bins greatly reduces the deleterious effect of the direct blast. The rejection of the direct blast in range-doppler bins sufficiently far from the blast in frequency can be on the order of 36 dB for waveforms typically used in these systems.

Another technique for reducing direct blast interference is to use a series of waveforms with low cross-ambiguity, so that a direct blast due to one waveform is reduced by the matched filter used to detect the echo of another waveform. However, many long range systems use only Pulsed Continuous Wave (PCW) and Hyperbolic Frequency Modulated (HFM) waveforms due to computational considerations. This results in a limited selection of low cross ambiguity waveforms. The cross-ambiguity of typical low frequency sonar waveforms is on the order of 20-25 dB, but can be as low as 10 dB.

Transmitting successive waveforms in separate receiver sub bands with very good out of band rejection, say 60-80 dB, can also be used to reduce direct blast interference. If the direct blast and the received echo fall in different sub bands, the direct blast level is reduced by the out of band rejection relative to the signal. Practical considerations limit the number of sub bands in a given system to a relatively small number.

Spatial rejection reduces the direct blast level provided the source and target arrive from different directions. This is implemented in a beamformer, which achieves a directional response in the direction of the signal by computing a weighted sum of the delayed (or weighted) hydrophone outputs, with the delays and weights selected to yield the desired spatial response. Conventional beamformers maximize the response in the signal direction while reducing the response in all other directions to less than the sidelobe level. Practical systems achieve sidelobe levels of 20-25 dB.

For a direct blast that is 60 dB above the signal, a positive signal-to-noise ratio is typically achieved only when the echo and direct blast are in different sub bands. Thus, additional rejection is required if the target is to be detectable in other cases.

In passive systems, rejection of interferences is often achieved by steering of spatial nulls in the direction of the interference if the location of the interference is known with sufficient accuracy, or by means of various adaptive techniques which effectively steer a null if the interference is strong enough. Similar techniques have been used in active sonars to reject strong, continuous interferences or interferences whose duration is long in comparison to that of the transmitted waveform. In the case of the direct blast, however, the interference duration is nominally the same as that of the echo, and the direct blast-to-noise ratio is much higher than interference-to-noise ratios generally encountered. The combination of these differences results in an effect in the spatial processing that differs from cases usually considered. However, while the very high interference-to-noise ratio associated with the direct blast requires some changes to conventional spatial processing techniques, it does allow accurate determination of the location of the arrival direction of the direct blast.

SUMMARY OF THE INVENTION

A multi-static sonar system having direct blast interference suppression is described. The system includes a sonar transmitter, a sonar transmit transducer array, a sonar receive transducer array spatially separated from the transmit array, and a null steering beamformer coupled to the receiver array for forming one or more receive beams in one or more desired directions, for forming a null response beam in a nominal direction of the transmit array from the receive array, and for providing beamformer output signals. In accordance with the invention, the system further includes automatic gain control (AGC) means for applying variable gain to the beamformer output signals. The AGC variable gain has a first value in all cases except when a level of the beamformer output signals exceeds a predetermined threshold value, Thus, the gain is substantially reduced to a relatively smaller second value for a predetermined time interval at the leading and trailing edges of received direct blast interference from the transmit array to suppress spatial transients occurring in the beamformer output signal at the leading and trailing edges of the direct blast. The system further includes processing means for processing the output of the AGC to provide a sonar system output signal.

The first gain value of the AGC is preferably unity, and the second gain value is much less than unity.

In an exemplary implementation, the AGC comprises delay means for delaying the beamformer output signals by a delay interval, means for providing an estimate of the output power in an undelayed sample of the beamformer output signal, means for normalizing the delayed output signal by the power estimate, and means for comparing the normalized output signal to said threshold value. In a digitized system, the beamformer output signals are in the form of digitized data samples, the delay means is a digital delay line, and the normalizing means includes a means for determining the squared value of undelayed versions of the samples, and means for providing an average value of the squared values over a time window.

In accordance with another aspect of the invention, a method is described for suppressing direct blast interference in a multi-static sonar system including a sonar receive transducer array spatially separated from a transmit source, and a null steering beamformer coupled to said receive array for forming one or more receive beams in one or more desired directions, comprising a sequence of the following steps:

applying a first gain to the beamformer output signals in the absence of direct blast interference, when a level of the beamformer output signals does not exceed a threshold value;

applying a second reduced gain to the beamformer output signals in the presence of direct blast interference only when a level of the beamformer output signals exceeds a threshold value, wherein the second gain is substantially reduced from the first gain for a time interval at leading and trailing edges of received direct blast interference from the transmit source to suppress spatial transients occurring in the beamformer output signal at the leading and trailing edges of the direct blast interference; and processing the output of the beamformer output signals to which the gain has been applied to provide a sonar system output signal.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

An active sonar system typically employs matched filter detection at the output of a beamformer. Examination of the matched filter input has revealed why the direct blast is not more completely rejected. At the leading and trailing edges of the direct blast, a large spike of energy will "leak" through the beamformer null. These spikes are short in duration, on the order of 0.01 times the duration of the direct blast, so that the energy in the spikes is 20 dB down from the total direct blast energy. However, because the direct blast is 40-60 dB above the signal the leakage is sufficient to obscure the signal.

Figure 1:
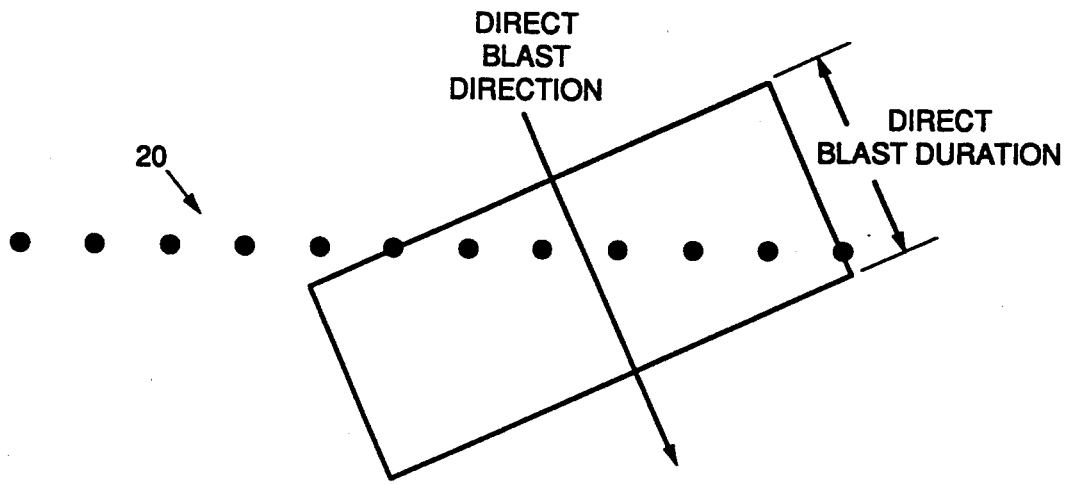
FIG. 1 illustrates direct blast propagation through an array of sensors.

To understand the source of the leakage through the beamformer, consider the direct blast waveform as it propagates across an array 20 of sensors, as shown in FIG. 1. When the leading edge reaches the array (from any angle other than broadside) only the closest hydrophone is ensonified, so the direct blast component of the beamformer output consists of the hydrophone output times the weight value. As the wavefront propagates across the array, successively more hydrophones are illuminated. The weights are designed to steer a null when the entire array is illuminated. Thus, the beamformer does not effectively steer a null in the direction of the direct blast until the array is "filled." Similarly, the null is not properly steered as the waveform propagates out of the array. These two phenomena cause beamformer output spikes at the leading and trailing edges of the direct blast, referred to herein as "spatial transients." The duration of the spatial transients is therefore related to the time it takes for the waveform to fill the array, and hence, to the array length and the arrival angle of the target. In multistatic sonars, the receiver generally uses very long line arrays, and the source is substantially away from the array broadside.

Figure 2:
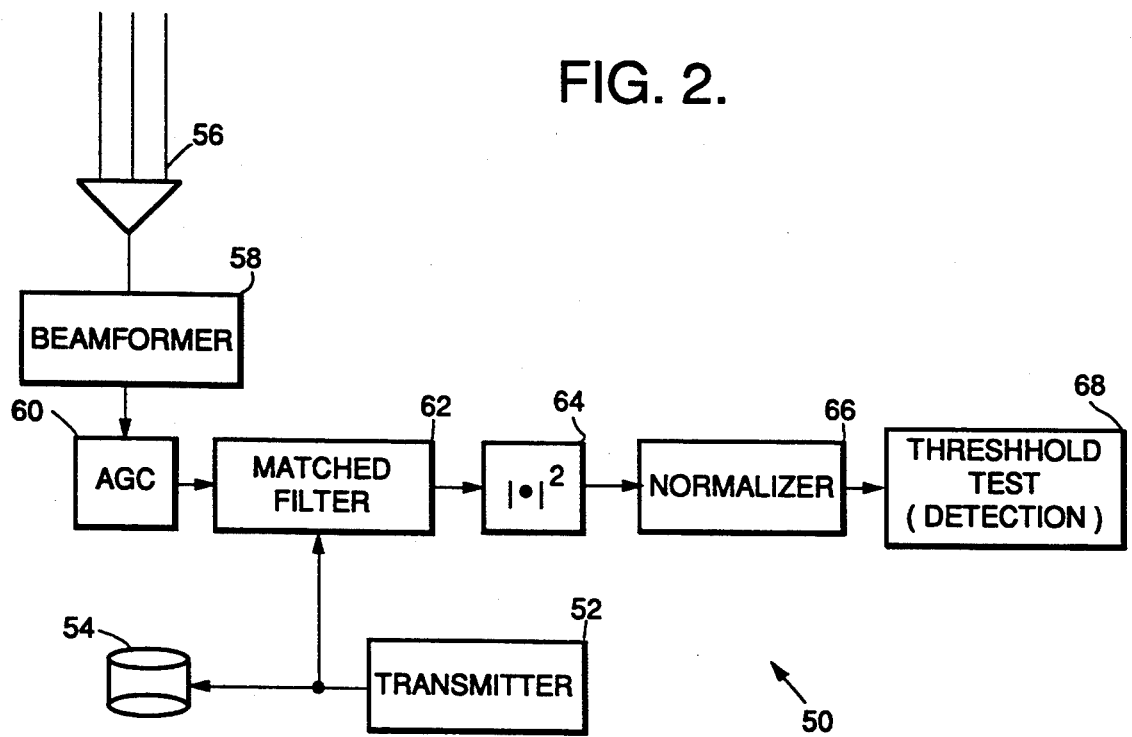
FIG. 2 shows a bi-static sonar system embodying the present invention.

The spatial transients can be effectively eliminated from the beamformer output, in accordance with the invention, by incorporating an automatic gain control (AGC) at the output of the null steering beamformer, as shown in FIG. 2. Thus, the bi-static system of FIG. 2 includes a transmitter 52 connected to a transmit array 54 of hydrophones, for transmission of an active sonar waveform. A receive array 56 of hydrophones, spatially separated from the transmit array 54, is connected to a beamformer 58. The beamformer output is in turn passed through the AGC 60 in accordance with the invention to the matched filter 62. The magnitude of the output of the matched filter is squared at function 64, normalized by normalizer 66, and subjected to a threshold detection test at detector 68. It will be understood that the array 50, less the AGC 60, is otherwise conventional.

Figure 3:
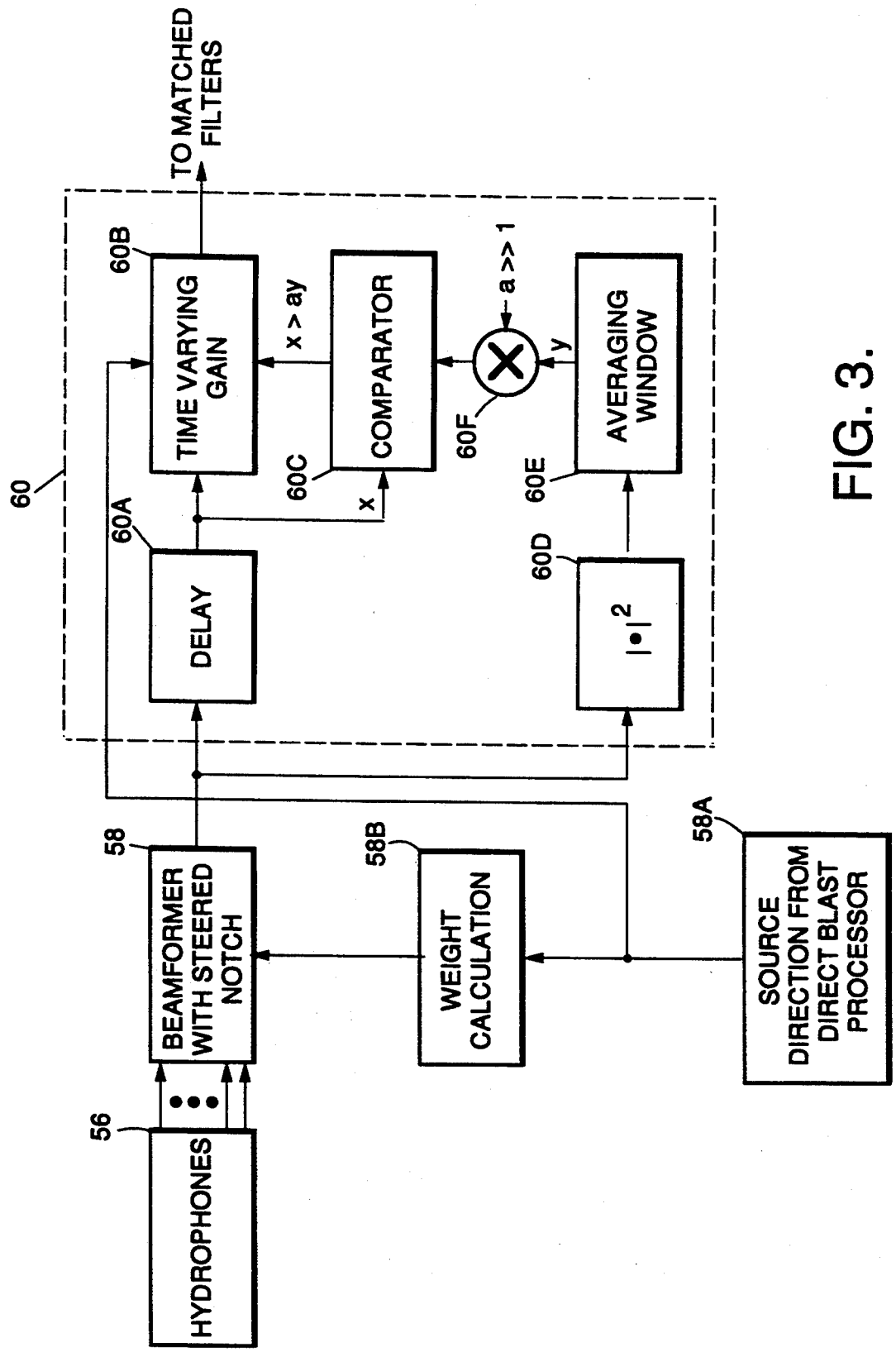
FIG. 3 is a simplified schematic diagram illustrating the automatic gain control function of the system of FIG. 2.

The AGC 60 is illustrated in further detail in FIG. 3, and is controlled by a normalizer comprising function blocks 60D and 60E which computes an estimate of the power in a window preceding the current beamformer output sample, and uses it to normalize the current output. The output of the beamformer (58) is delayed by a delay line (60A) before being passed through a programmable gain (60B). The magnitude of an undelayed version of the beamformer output is squared (60D) and averaged over a time window (60E). The output y of the averaging window 60E is an estimate of the noise background. This value is then multiplied at multiplier 60F by a scalar having a value of a>>1 to produce a threshold (=ay) used to detect the direct blast transient.

The function of the comparator 60C is to detect the direct blast transient, by comparing a delayed version of the beamformer output to the threshold ay. If the delayed output x of the beamformer is greater than the threshold, a direct blast transient is detected. In this event, the time varying gain of variable gain/attenuation device 60B is set to G<<1 to scale down the beamformer output.

If x(n) is the current beamformer output sample, then the power estimate is $$P(n) = (1/M) \sum_{m=0}^{M-1} |x(n + D)|^2$$

where D is the number of samples by which the estimate leads the current beamformer output. The normalized beamformer output power is then $$o(n) = (|x(n)|^2)/(P(n))$$

The gain of the AGC 60 is unity in all cases except when the normalized beamformer output power exceeds a threshold, $T_p$. When the threshold is exceeded, the gain is reduced to G<<1 for a duration of $\tau$ seconds centered around the point at which the threshold is exceeded. The value of $\tau$ is typically set to slightly exceed the transient duration, which is a function of the size of the array. The objective is to determine when the spatial transients exist in the output and reduce their level to be comparable to the signal level. If the transients have 1/H times the power of the entire direct blast, $P_{DB}$, where H>>1, then, provided $\tau$ exceeds the transient duration, the power in the spatial transients at the AGC output is $P_{DB}G^2/H$, which is set small enough to allow detection of the signal. Since a signal arriving from another direction is passed by the beamformer, its power is attenuated by at most $$A_s = [1 - 2 (\tau/T) (1-G^2)]$$

where T is the waveform duration. This attenuation, $A_s$, is only slightly less than unity given that G<<1 and $\tau$<<T.

Figure 4:
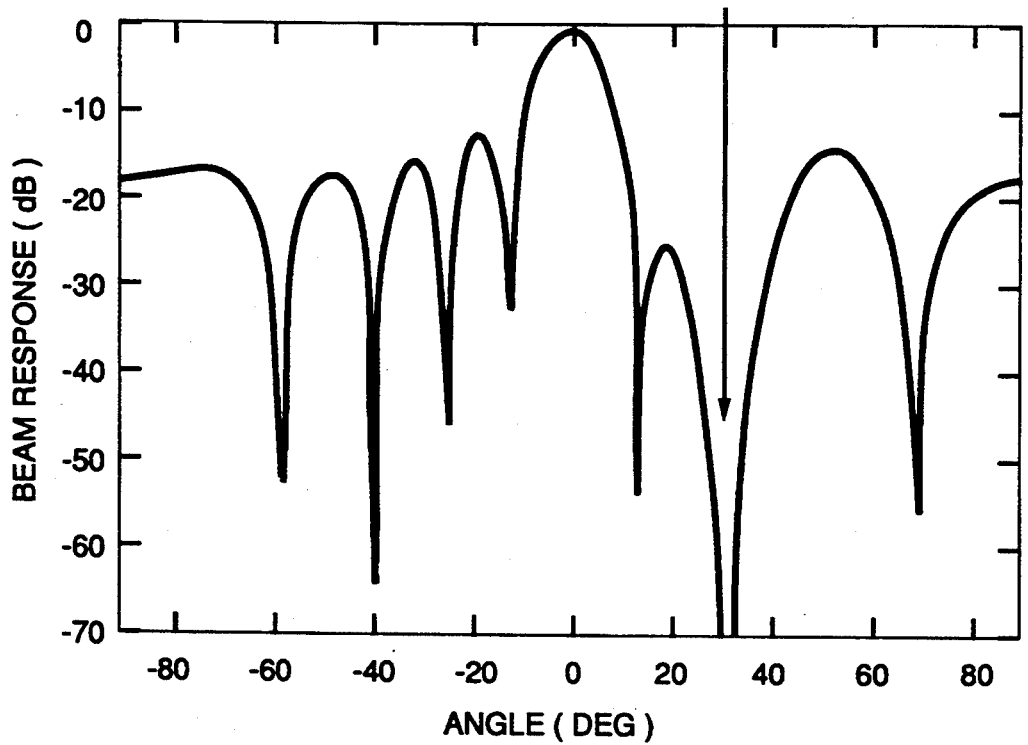
FIG. 4 is an exemplary beam pattern for a particular sonar system array embodying the invention, showing a notch formed with three nulls.

Given an ideal situation, including perfect knowledge of the arrival angle of the direct blast, a single plane wave arrival at the receiver (no multipath), and an ideal implementation of the null steering beamformer, use of a single null would be adequate for direct blast rejection. However, in practical systems, multipath may cause the direct blast to be spread over a narrow range of arrival angles, and measurement errors limit the accuracy of the estimate of the source arrival angle. The direct blast spatial rejection technique in accordance with the invention therefore uses a beamformer notch steered in the nominal direction of the source by a weight calculation 58B, with the weights selected in dependence on the nominal source direction data provided by the direct blast processor 58A. Such a notch is constructed by placing a series of nulls close together over the desired notch width, as shown in FIG. 4. In this example, 3 nulls are equally spaced over a 3° sector to produce the notch. In this case, the nulls are steered using linear constraints as described in "An Algorithm for Linearly Constrained Adaptive Array Processing," O. L. Frost, Proceedings of the IEEE, Vol. 60, No. 8, August 1972, but any method of steering nulls in a desired direction will suffice. Use of a notch has a beneficial effect on the performance of this direct blast spatial rejection when the beamformer is implemented in the frequency domain in a practical system. A frequency domain implementation is the most effective way to implement a beamformer which must maintain multiple spatial constraints, especially nulls, over a frequency band.

Figure 5:
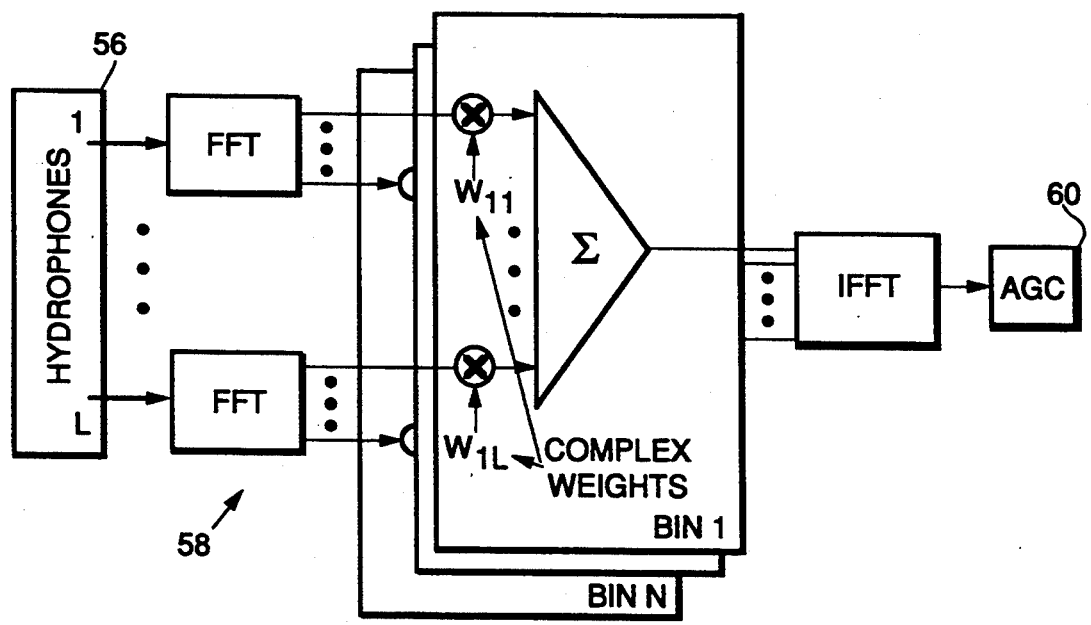
FIG. 5 is a simplified schematic diagram showing a frequency domain implementation of a beamformer useful in a bi-static sonar system in accordance with the invention.

When implemented in the frequency domain in a digital (sampled) system, as shown in FIG. 5, the null is designed at the center of each Fast Fourier Transform (FFT) bin by multiplying each hydrophone in each bin by a complex coefficient. The null is only steered in the designated direction when the signal falls at a bin center frequency. Because typically nulls are quite sharp, small frequency differences from bin center significantly reduce direct blast attenuation, and with the high direct blast levels, signal detectability is reduced. Because doppler shift on the direct blast is not known exactly, even with the single frequency (pulsed continuous wave, PCW) signals cannot be maintained at bin center. Use of a spatial notch as described above maintains the direct blast attenuation at acceptable levels when the signal is not at an FFT bin center by assuring that when the signal is not a bin center, it is close to one of the nulls making up the notch.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A multi-static sonar system having direct blast interference suppression, comprising:

a sonar receive transducer array spatially separated from a transmit source;

a null steering beamformer coupled to said receive array for forming one or more receive beams in one or more desired directions, for forming a null response beam in a nominal direction of said transmit source from said receive array, and for providing beamformer output signals;

automatic gain control (AGC) means for applying variable gain to said beamformer output signals, said variable gain having a first value in all cases except when a level of said beamformer output signals exceeds a threshold value, wherein said gain is substantially reduced to a relatively smaller second value for a time interval at the leading and trailing edges of received direct blast interference from said transmit source to supress spatial transients occuring in said beamformer output signal at said leading and trailing edges of said direct blast; and processing means for processing the output of said AGC means to provide a sonar system output signal.

2. The sonar system of claim 1 wherein said first gain value is substantially unity, and said second gain is less than unity.

3. The sonar system of claim 1 wherein said AGC means comprises detecting means for detecting said spatial transient occurring in said beamformer output signal and providing a detection signal indicating the presence of said transient, and a variable gain means responsive to said detection signal for applying said variable gain to said beamformer output signals.

4. The system of claim 1 wherein said beamformer is responsive to digitized samples of transducer output signals from transducers comprising said receive array, and said beamformer is implemented in the frequency domain to provide nulls steered to a designated nominal direction of the direct blast interference at the center frequency of each of a plurality of Fast Fourier Transform (FFT) bins by multiplying each transducer output signal sample by a complex coefficient.

5. The system of claim 4 wherein said beamformer is operated to construct a beamformer notch in the responsiveness of said beamformer in the nominal direction of said direct blast interference, said notch constructed by placing a series of closely spaced nulls in said beamformer response close together over the desired notch width.

6. The system of claim 1 wherein said time interval slightly exceeds a nominal spatial transient time duration.

7. The system of claim 1 wherein said time interval during which said gain is reduced is centered about a time point at which said beamformer output signals first exceed said threshold value.

8. The system of claim 1 wherein said time interval is substantially less than a duration of a target signal arriving at said receive transducer array from a direction different from said nominal direction of said transmit source, so that said target signal is not substantially attentuated to permit said target signal to be detected.

9. A multi-static sonar system having direct blast interference suppression, comprising:
- a sonar transmitter;
- a sonar transmit transducer array;
- a sonar receive transducer array spatially separated from said transmit array;
- a null steering beamformer coupled to said receive array for forming one or more receive beams in one or more desired directions, for forming a null response beam in a nominal direction of said transmit array from said receive array, and for providing beamformer output signals;
- automatic gain control (AGC) means for applying variable gain to said beamformer output signals, said variable gain having a first value in all cases except when a level of said beamformer output signals exceeds a threshold value, wherein said gain is substantially reduced to a relatively smaller second value for a time interval at the leading and trailing edges of received direct blast interference from said transmit array to suppress spatial transients occuring in said beamformer output signal at leading and trailing edges to said direct blast; and
- processing means for processing the output of said AGC means to provide a sonar system output signal.

10. The sonar system of claim 9, wherein said first gain value is substantially unity, and said second value is less than unity.

11. The sonar system of claim 9 wherein said AGC means comprises detecting means for detecting said spatial transient occurring in said beamformer output signal and providing a detection signal indicating the presence of said transient, and a variable gain means responsive to said detection signal for applying said variable gain to said beamformer output signals.

12. The system of claim 9 wherein said beamformer is responsive to digitized samples of transducer output signals from transducers comprising said receive array, and said beamformer is implemented in the frequency domain to provide nulls steered to a designated nominal direction of the direct blast interference at the center frequency of each of a plurality of Fast Fourier Transform (FFT) bins by multiplying each transducer output signal sample by a complex coefficient.

13. The system of claim 12 wherein said beamformer is operated to construct a beamformer notch in the responsiveness of said beamformer in the nominal direction of said direct blast interference, said notch constructed by placing a series of closely spaced nulls in said beamformer response close together over the desired notch width.

14. The system of claim 9 wherein said time interval slightly exceeds a nominal spatial transient time duration.

15. The system of claim 9 wherein said time interval during which said gain is reduced is centered about a time point at which said beamformer output signals first exceed said threshold value.

16. The system of claim 9 wherein said time interval is substantially less than a duration of a target signal arriving at said receive transducer array from a direction different from said nominal direction of said transmit array, so that said target signal is not substantially attenuated to permit said target signal to be detected.

17. A method for suppressing direct blast interference in a multi-static sonar system including a sonar receive transducer array spatially separated from a transmit source, and a null steering beamformer coupled to said receive array for forming one or more receive beams in one or more desired directions, for forming a null response beam in a nominal direction of said transmit source from said receive array, and for providing beamformer output signals, comprising a sequence of the following steps:
- applying a first gain to said beamformer output signals in the absence of direct blast interference, when a level of said beamformer output signals does not exceed a threshold value;
- applying a second reduced gain to said beamformer output signals in the presence of direct blast interference when a level of said beamformer output signals exceeds a threshold value, and for a time interval, wherein said second gain is reduced from said first gain time for a time interval at leading and trailing edges of received direct blast interference from said transmit source to supress spatial transients occurring in said beamformer output signal at said leading and trailing edges of said direct blast; and
- processing the output of the beamformer to which said gain has been applied to provide a sonar system output signal.

18. The method of claim 17 wherein said first gain value is substantially unity, and said second value is less than unity.

19. The method of claim 17 further comprising the step of detecting said spatial transient occurring in said beamformer output signal and providing a detection signal indicating the presence of said transient, and wherein said step of applying a second gain to said beamformer output signals is responsive to said detection signal to apply said second gain to said beamformer output signals.

20. The method of claim 17 wherein said beamformer is responsive to digitized samples of transducer output signals from transducers comprising said receive array, and said beamformer is implemented in the frequency domain to provide nulls steered to a designated nominal direction of the direct blast interference at the center frequency of each of a plurality of Fast Fourier Transform (FFT) bins by multiplying each transducer output signal sample by a complex coefficient.

21. The method of claim 20 wherein said beamformer is operated to construct a beamformer notch in the responsiveness of said beamformer in the nominal direction of said direct blast interference, and said notch is constructed by placing a series of closely spaced nulls in said beamformer response close together over the desired notch width.

22. The method of clam 17 wherein said time interval slightly exceeds a nominal spatial transient time duration.

23. The method of claim 17 wherein said time interval during which said gain is reduced is centered about a time point at which said beamformer output signals first exceed said threshold value.

24. The method of claim 17 wherein said time interval is substantially less than a duration of a target signal arriving at said receive transducer array from a direction different from said nominal direction of said transmit source, so that said target signal is not substantially attenuated to permit said target signal to be detected.

25. A multi-static sonar system having direct blast interference suppression, comprising:
a sonar receive transducer array spatially separated from a transmit source;
a null steering beamformer coupled to said receive array for forming one or more receive beams in one or more desired directions, for forming a null response beam in a nominal direction of said transmit source from said receive array, and for providing beamformer output signals;
automatic gain control (AGC) means for applying variable gain to said beamformer output signals, said variable gain having a first value in all cases except when a level of said beamformer output signals exceeds a threshold value, wherein said gain is substantially reduced to a relatively smaller second value for a time interval at the leading and trailing edges of received direct blast interference from said transmit source to suppress spatial transients occurring in said beamformer output signal at said leading and trailing edges of said direct blast;
said AGC means comprising detecting means for detecting said spatial transient occurring in said beamformer output signal and providing a detection signal indicating the presence of said transient, and a variable gain means responsive to said detection signal for applying said variable gain to said beamformer output signals, said detection means comprising delay means for delaying said beamformer output signals by a delay interval, means for providing an estimate of the output power in an undelayed sample of said beamformer output signal, means for determining said threshold value in dependence on said power estimate, and means for comparing said delayed beamformer output signal to said threshold value to provide said detection signal if said delayed beamformer output signal exceeds said threshold value; and
processing means for processing the output of said AGC means to provide a sonar system output signal.

26. The sonar system of claim 25 wherein said beamformer output signals are in the form of digitized data samples, said delay means comprises a digital delay line and said means for providing an estimate of the output power in said undelayed sample comprises means for determining the squared value of undelayed versions of said samples, and means for providing an average value of said squared values over a time window.

27. The system of claim 25 wherein said time interval during which said gain is reduced is centered about a time point at which said beamformer output signals first exceed said threshold value.

28. A multi-static sonar system having direct blast interference suppression, comprising:
a sonar transmitter;
a sonar transmit transducer array;
a sonar receive transducer array spatially separated from said transmit array;
a null steering beamformer coupled to said receive array for forming one or more receive beams in one or more desired directions, for forming a null response beam in a nominal direction of said transmit array from said receive array, and for providing beamformer output signals;
automatic gain control (AGC) means for applying variable gain to said beamformer output signals, said variable gain having a first value in all cases except when a level of said beamformer output signals exceeds a threshold value, wherein said gain is substantially reduced to a relatively smaller second value for a time interval at the leading and trailing edges of received direct blast interference from said transmit array to suppress spatial transients occurring in said beamformer output signal at said leading and trailing edges of said direct blast;
said AGC means comprising detecting means for detecting said spatial transient occurring in said beamformer output signal and providing a detection signal indicating the presence of said transient, and a variable gain means responsive to said detection signal for applying said variable gain to said beamformer output signals, said detection means comprising delay means for delaying said beamformer output signals by a delay interval, means for providing an estimate of the output power in an undelayed sample of said beamformer output signal, means for determining said threshold value in dependence on said power estimate, and means for comparing said delayed beamformer output signal to said threshold value to provide said detection signal if said delayed beamformer output signal exceeds said threshold value processing means for processing the output of said AGC means to provide a sonar system output signal.

29. The sonar system of claim 28 wherein sad beamformer output signals are in the form of digitized data samples, said delay means comprises a digital delay line, and said means for providing an estimate of the output power in said undelayed sample comprises a means for determining the squared value of undelayed versions of said samples, and means for providing an average value of said squared values over a time window.

30. A method for suppressing direct blast interference in a multi-static sonar system including a sonar receive transducer array spatially separated from a transmit source, and a null steering beamformer coupled to said receive array for forming one or more receive beams in one or more desired directions, for forming a null response beam in a nominal direction of said transmit source from said receive array, and for providing beamformer output signals, comprising a sequence of the following steps:

applying a first gain to said beamformer output signals in the absence of direct blast interference, when a level of said beamformer output signals does not exceed a threshold value;

detecting said spatial transient occurring in said beamformer output signal and providing a detection signal indicating the presence of said transient, said detecting step comprising:

delaying said beamformer output signals by a delay interval;

providing an estimate of the output power in an undelayed sample of said beamformer output signal;

determining said threshold value in dependence on said power estimate; and comparing said delayed beamformer output signal to said threshold value to provide said detection signal if said delayed beamformer output signal exceeds said threshold value;

applying a second reduced gain to said beamformer output signals in the presence of direct blast interference only when a level of said beamformer output signals exceeds a threshold value, wherein said second gain is substantially reduced from said first gain for a time interval at leading and trailing edges of received direct blast interference from said transmit source to suppress spatial transients occurring in said beamformer output signal at said leading and trailing edges of said direct blast, wherein said step of applying a second gain to said beamformer output signals is responsive to said detection signal to apply said second gain to said beamformer output signals; and processing the output of the beamformer to which said gain has been applied to provide a sonar system output signal.

31. The method of claim 30 wherein said beamformer output signals are in the form of digitized data samples, said step of providing an estimate of the output power in said undelayed sample comprises determining the squared value of undelayed versions of said sample and providing an average value of said squared values over a time window.

* * * * *